(12) United States Patent
Gilchrist et al.

(10) Patent No.: US 7,516,610 B2
(45) Date of Patent: Apr. 14, 2009

(54) SCALABLE FLAT-PANEL NANO-PARTICLE MEMS/NEMS THRUSTER

(75) Inventors: Brian E. Gilchrist, Ann Arbor, MI (US); Alec D. Gallimore, Ann Arbor, MI (US); Michael Keidar, Oak Park, MI (US); Louis Musinski, Ann Arbor, MI (US); Thomas M. Liu, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 202 days.

(21) Appl. No.: 11/545,037

(22) Filed: Oct. 6, 2006

(65) Prior Publication Data

US 2009/0056305 A1 Mar. 5, 2009

Related U.S. Application Data

(60) Provisional application No. 60/724,646, filed on Oct. 7, 2005.

(51) Int. Cl.
*F03H 1/00* (2006.01)
*H05H 1/00* (2006.01)

(52) U.S. Cl. .......................... 60/202; 60/204

(58) Field of Classification Search .................. 60/202, 60/204
See application file for complete search history.

(56) References Cited

U.S. PATENT DOCUMENTS

| | | | |
|---|---|---|---|
| 4,838,021 A * | 6/1989 | Beattie ........................ | 60/202 |
| 5,369,953 A * | 12/1994 | Brophy ........................ | 60/202 |
| 5,947,421 A * | 9/1999 | Beattie et al. ............ | 244/171.1 |
| 6,216,445 B1 * | 4/2001 | Byers et al. ................ | 60/203.1 |
| 6,318,069 B1 * | 11/2001 | Falce et al. .................. | 60/202 |
| 6,378,290 B1 * | 4/2002 | Killinger et al. ............. | 60/202 |
| 7,269,940 B2 * | 9/2007 | Wiseman ..................... | 60/202 |
| 2005/0257515 A1 * | 11/2005 | Song .......................... | 60/202 |

* cited by examiner

*Primary Examiner*—William H Rodríguez
(74) *Attorney, Agent, or Firm*—Harness, Dickey & Pierce, P.L.C.

(57) ABSTRACT

A scalable flat-panel nano-particle MEMS/NEMS thruster includes a grid having a plurality of electrodes to establish electrical fields. A liquid is disposed in a liquid reservoir of the grid. The liquid is positioned within the electrical fields. A plurality of nano-particles are suspended in the liquid. A plurality of MEMS and NEMS micron-size vias are disposed in the grid. The electrical fields extract the plurality of nano-particles from the liquid and accelerate the nano-particles in the vias to provide propulsion system thrust.

34 Claims, 10 Drawing Sheets

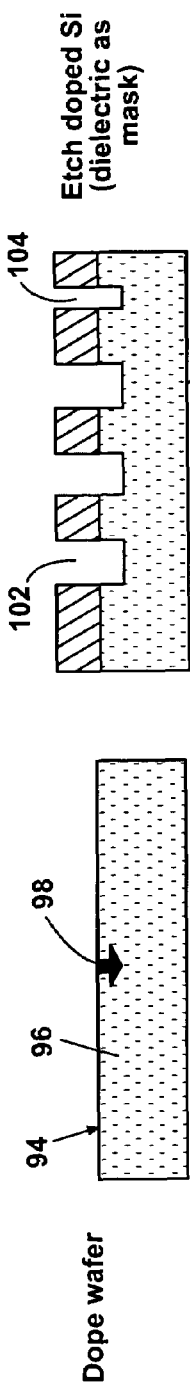
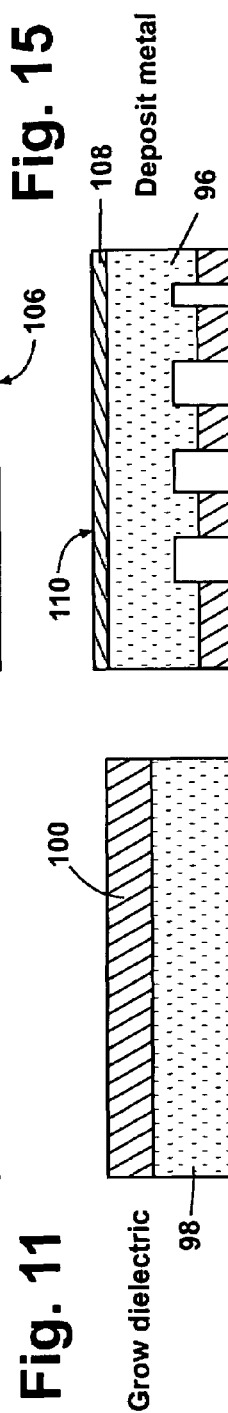
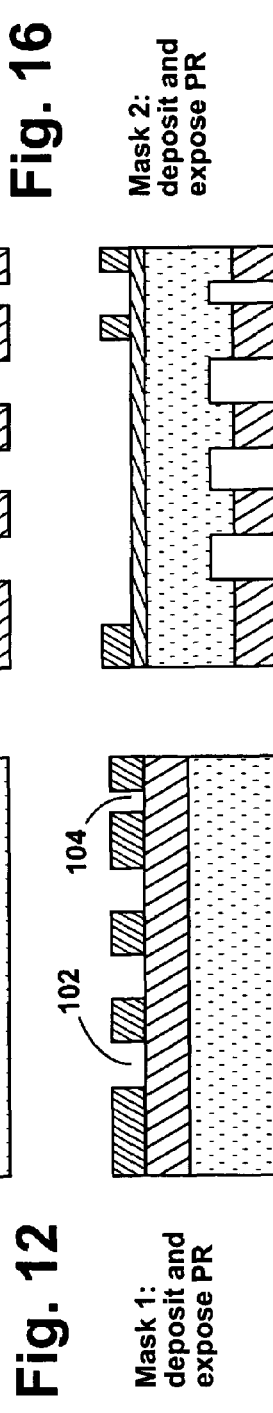
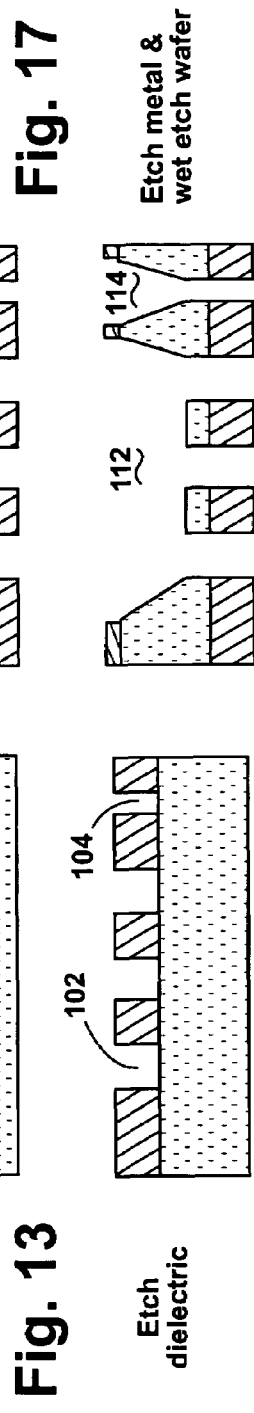
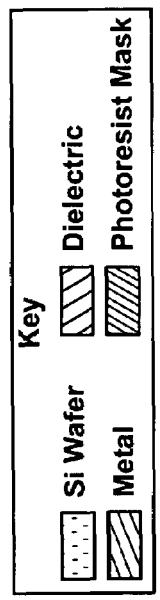

SCALABLE FLAT-PANEL NANO-PARTICLE MEMS/NEMS THRUSTER

CROSS-REFERENCE TO RELATED APPLICATIONS

This application claims the benefit of U.S. Provisional Application No. 60/724,646, filed on Oct. 7, 2005. The disclosure of the above application is incorporated herein by reference.

FIELD

The present disclosure relates to propulsion systems and, more particularly, relates to electrostatic thrusters using nano-particles with micro- and nano-electromechanical systems (NEMS/MEMS) fabrication technology.

BACKGROUND

The statements in this section merely provide background information related to the present disclosure and may not constitute prior art.

A present-day ion thruster block-diagram is illustrated in FIG. 1. The ion thruster 10 creates a plasma using a gas (e.g. Xe) fed into a chamber 12 and allows the ions as an ion beam 14 to escape across an accelerating grid structure 16. There are several practical limitations to the ion thruster 10 of FIG. 1: (1) the ionization process represents an important life-limiting factor, (2) an important fraction of the propellant is never ionized, and (3) the plasma interacts with the walls and the grid, thus generating waste heat and limiting the lifetime of ion thruster 10.

The concept of utilizing field emission and electrostatic acceleration of ions is well known as Field Emission Electric Propulsion (FEEP). FEEP thrusters can produce specific impulses above 10,000 seconds at electrical efficiencies exceeding 90% using melted metal liquid propellant such as indium. However, known FEEPs use needle-like emitters that require footprints many times wider than the needle tips. Thus, their potential for being scaled-up to multi-kW power levels is doubtful.

SUMMARY

According to several embodiments of the present disclosure, a propulsion system includes a grid having a plurality of MEMS and NEMS micron-size vias disposed in the grid. The grid is operable to establish electrical fields to extract and accelerate a plurality of nano-particles to provide propulsion system thrust.

According to other embodiments, a scalable flat-panel nano-particle mems/nems thruster includes a grid having a plurality of electrodes to establish electrical fields. A liquid is disposed in a liquid reservoir of the grid. The liquid is positioned to be contacted by the electrical fields. A plurality of nano-particles are suspended in the liquid. A plurality of MEMS and NEMS micron-size vias are disposed in the grid. The electrical fields are operable to extract the plurality of nano-particles from the liquid and accelerate the nano-particles in the vias to provide propulsion system thrust.

According to still other embodiments, a propulsion system includes a planar grid. The grid includes a liquid having a surface. A plurality of nano-particles are disposed in the liquid. An electrode is immersed in the liquid operable to charge the particles by contact of the particles with the electrode. A plurality of gate structures generate both an electric field and an electrostatic force, the electrostatic force is operable to lift the particles off the electrode and to overcome a surface tension force of the liquid allowing the particles to escape through the surface of the liquid. A plurality of vias within each of the gate structures are each adapted to receive and discharge the particles after escape through the surface of the liquid. The imposed electric field acts through the vias to accelerate the particles and generate a thrust force.

According to still other embodiments, a method for operating a nano-particle thruster system includes suspending a plurality of nano-particles in a liquid. The liquid is circulated to transport the nano-particles to a plurality of extraction zones. The nano-particles are charged at the extraction zones by contact of the particles with an electrode immersed in the liquid. The nano-particles are lifted off the electrode using an imposed electric field creating an electrostatic force. The nano-particles are then extracted through a surface of the liquid using the electrostatic force, the electrostatic force overcoming a surface tension force of the liquid. The nano-particles are accelerated using the imposed electric field to generate a thrust.

According to still other embodiments, a method for operating a nano-particle thruster system includes suspending a plurality of cylindrical nano-particles in a dielectric liquid, and field focusing the electric field on a tip of the particles to rotate the particles from a first orientation having a longitudinal axis of the particles substantially parallel to the electrode to a second orientation substantially perpendicular to both the electrode and a surface of the liquid.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 11 is a side elevational view of an initial stage development for a doped wafer of a gate of the present disclosure;

FIG. 12 is a side elevational view similar to FIG. 11, further showing a dielectric added to the doped wafer;

FIG. 13 is a side elevational view similar to FIG. 12, further showing a masking applied to the dielectric;

FIG. 14 is a side elevational view similar to FIG. 13, further showing a plurality of emission channels and scribe lines;

FIG. 15 is a side elevational view similar to FIG. 14, further showing the wafer after etching;

FIG. 16 is a side elevational view similar to FIG. 15, further showing a deposited metal layer;

FIG. 17 is a side elevational view similar to FIG. 16, further showing a masking applied to the layer of metal; and FIG. 18 is a side elevational view similar to FIG. 17, further showing the completed wafer after etching of the metal layer.

DETAILED DESCRIPTION

The following description is merely exemplary in nature and is in no way intended to limit the present disclosure, application, or uses.

The present disclosure uses highly scalable MEMS/NEMS technologies applied to both nano-particle and ion propulsion and is referred to as nano-Field Emission Thruster (nanoFET). The present nanoFET system uses conductive nano-particles of well characterized dimensions and charge states. These nano-particles can be suspended in liquid such as a low vapor pressure dielectric liquid or a conductive liquid, which is circulated and transported to extraction zones through microfluidic channels. At the extraction zones, the particles are charged for example via contact with an electrode that is immersed in the dielectric liquid. When particles acquire sufficient charge, they are lifted off the electrode by an imposed electric field provided by biased MEMS gate structures. Particles are transported to the liquid surface by the electrostatic force and must then overcome the surface tension force of the liquid to be extracted from the liquid. Following extraction, the particles are accelerated by the imposed electric field to provide thrust.

Figure 2:
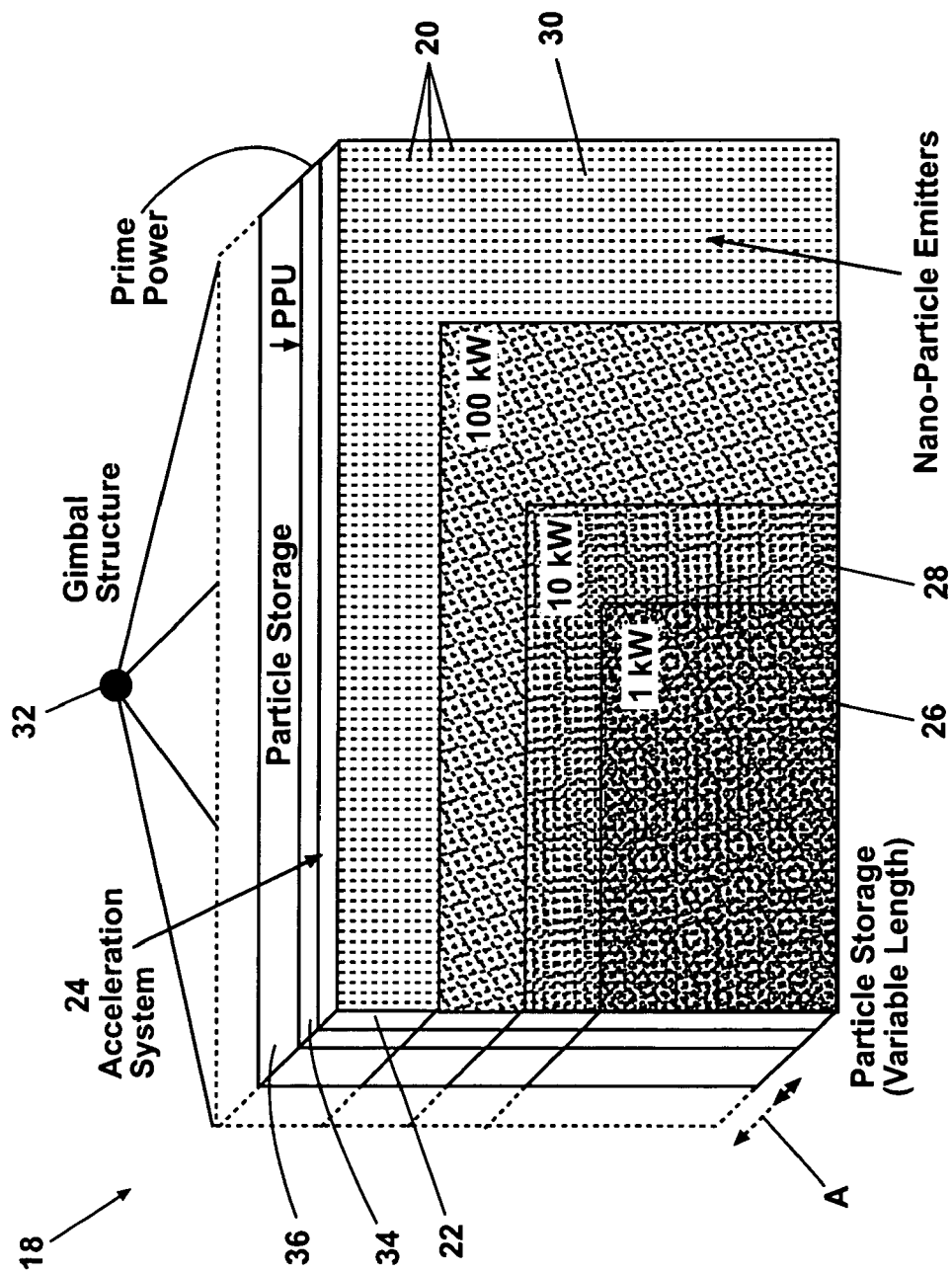
FIG. 2 is a front perspective view of a scalable flat-panel nano-particle mems/nems thruster of the present disclosure.
Figure 3:
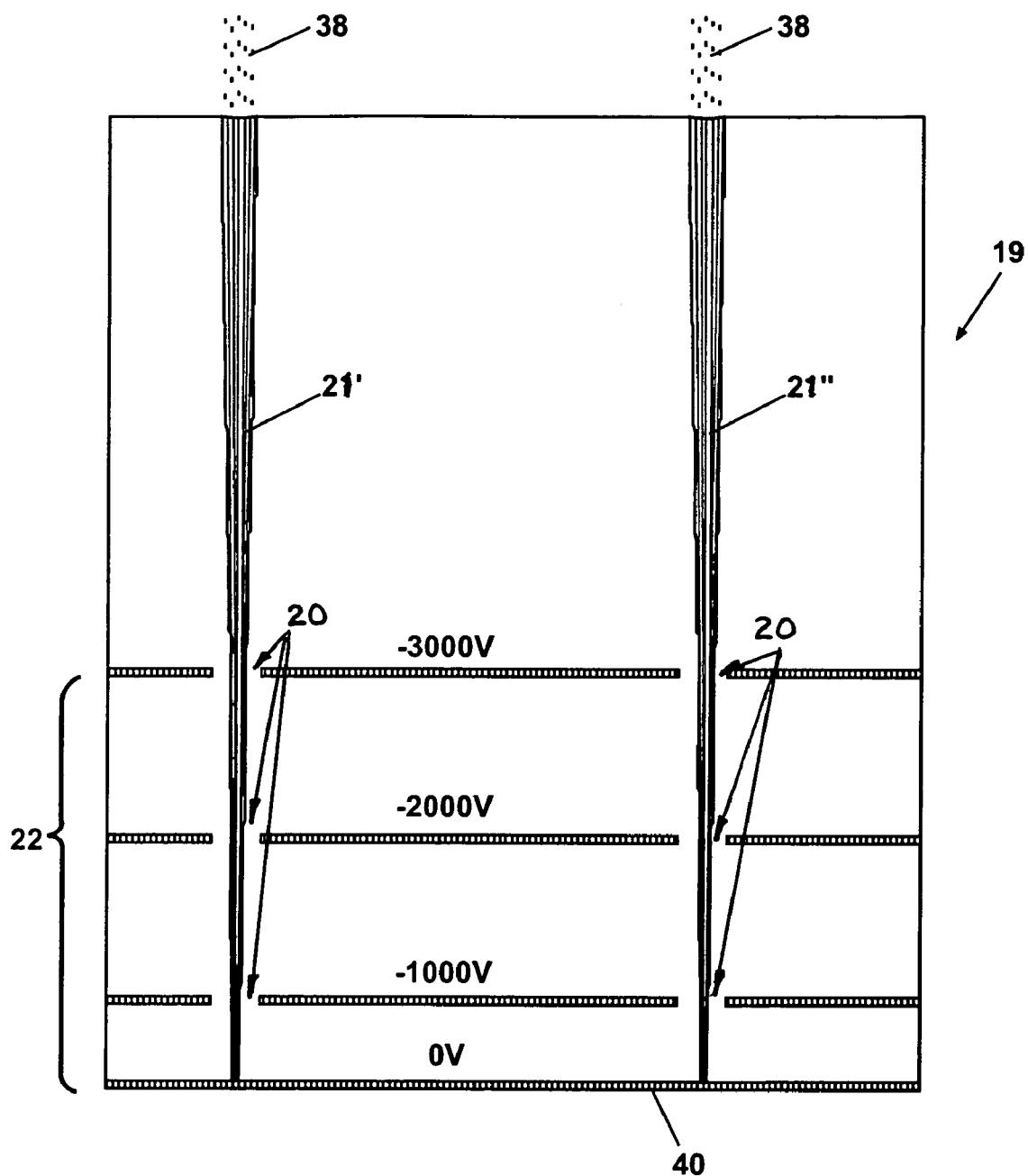
FIG. 3 is a cross-sectional side elevation view of exemplary via flow paths for a multi-layer grid of the thruster of FIG. 2.
Figure 4:
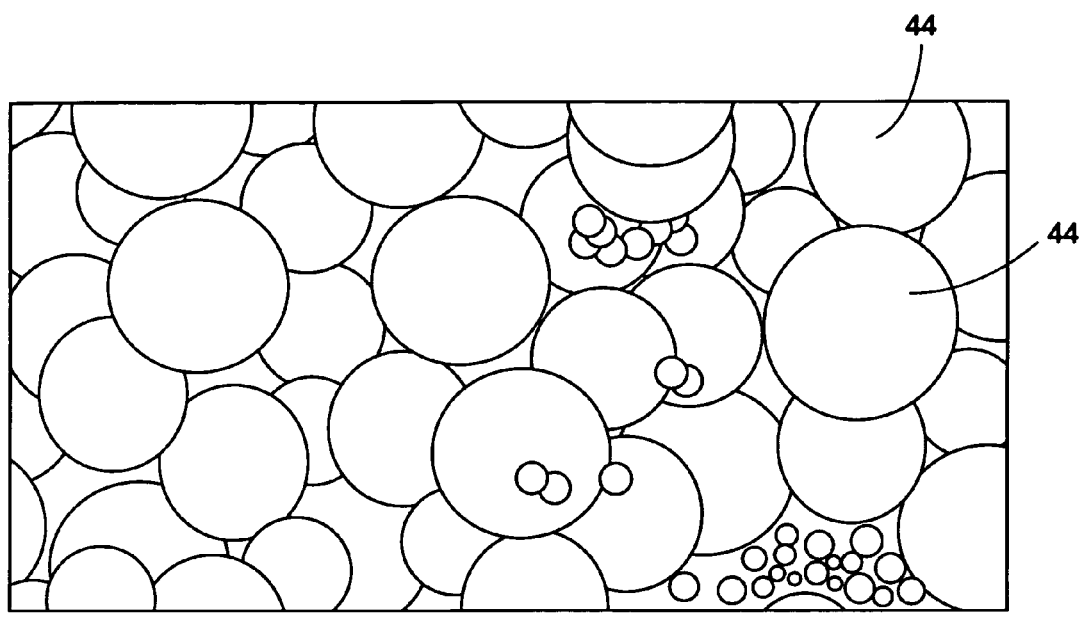
FIG. 4 is a side elevational view of a plurality of nano-particles of multiple sizes in random distribution.

According to the principles of the present disclosure, and referring to FIGS. 2 through 4, a scalable flat-panel nano-particle MEMS/NEMS thruster system 18 is provided. A system sketch of a flat-panel MEMS/NEMS based thruster system 18 employing either or both nano-particles and ions as propellant is illustrated in FIG. 2. A multi-layer grid 22 forms part of an acceleration system 24 which can be used in various sizes to create for example a 1 kW thruster 26, a 10 kW thruster 28, or a 100 kW thruster 30. Thruster system 18 can be supported by a gimbal structure 32 and can further include a prime power unit (PPU) 34 and at least one particle storage unit 36. Multiple particle storage units 36 can also be added which can vary a length of thruster system 18 in the direction of arrow "A".

As best seen in FIG. 3, in a first section 19 at the core of flat-panel thruster system 18, millions of MEMS/NEMS based micron-size vias 20 define passageways through the grid permitting flow of particles such as ions as ion flows 21, shown in greater detail as an exemplary first ion flow 21' and a second ion flow 21". Vias 20 are used in conjunction with multi-layer grid 22 to establish sites for generation of critical electric-field levels to extract and accelerate ions 38 or other charged particles using field emission from the surface of a conductive material such as a conducting liquid 40 (e.g. indium).

Figure 5:
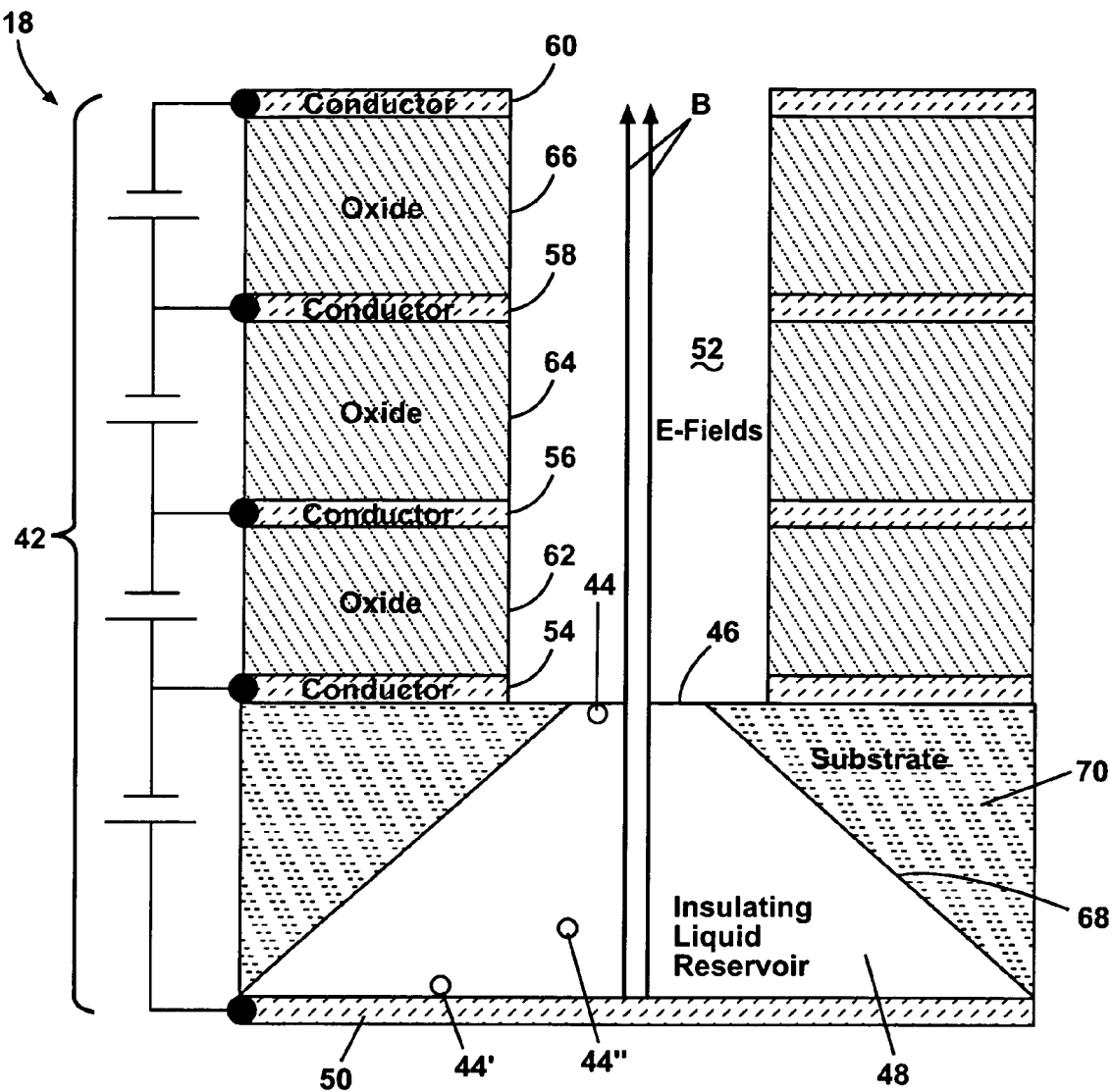
FIG. 5 is a cross-sectional side elevation view of the multi-layer grid of the thruster of FIG. 2 for an insulating liquid.

Alternatively, as shown in FIGS. 4 and 5, in a different section 42 of the thruster system 18, charged conducting nano-particles 44 are discharged from a surface 46 of an insulating (which can include mildly conductive) liquid 48 used to transport the particles. These nano-particles 44 can range in size from below 0.1 nm to over 100 nm. As best seen in FIG. 5, the nano-particles 44 are initially charged as shown at 44' from contact with a charged electrode or conductor 50 and can move through insulating liquid 48 to surface 46. When a sufficient Coulomb force is applied to overcome the liquid surface tension, the nano-particles 44 escape through surface 46 into a vacuum gap or charged field area 52 and undergo constant acceleration motion in the direction of arrows "B" induced by a plurality of conductors (shown in one embodiment as biased electrodes 54, 56, 58, and 60 defining successive pairs). The conductors or electrodes 54, 56, 58, and 60 are charged to a voltage which can be the same or different with respect to each other, and each successive pair of conductors is separated by a dielectric such as an oxide layer 62, 64, and 66 respectively. The insulating liquid 48 is contained in an insulating liquid reservoir 68 which is positioned in a substrate 70.

As will be shown more quantitatively herein, the use of nano-particles in the present nanoFET will allow for the ability to tune the specific impulse ($I_{sp}$) and thrust (T) of thruster system 18 over a very broad range at high efficiency. When little thrust with a high specific impulse is required, ions 38 can be emitted. As thrust requirements go up, small nano-particles 44' can be used to achieve slightly higher thrust and lower $I_{sp}$, and larger nano-particles 44" can be used for high thrust and low $I_{sp}$. The range of thrust T is principally limited by the size, shape, and density of the particles, as well as the potential that they pass through.

The use of nano-particles can be contrasted with the formation of small droplets such as produced by a colloid thruster. It is known that with a correct emission current and temperature, charge extraction in FEEPs can produce instabilities that sometimes result in the formation of charged microscopic droplets (colloids). While these droplets could in principle be used to accomplish the same propulsive goal as the present nano-particles, droplet sizes are difficult to control and a size spreading is expected that reduces thrust controllability. Using the present nanoFET propulsion concept with nano-particles that avoid the generation of colloids permits tuning of propulsion performance via charge-to-mass ratio of the nano-particles independently of other factors.

Several benefits of the present nanoFET approach include the use of multiple grids for high-finesse control of ion/nano-particle extraction and acceleration processes, robust material selection for field emission surfaces to ensure long life, and the use of separate ion and/or nano-particle emission zones to span a 100-10,000 s $I_{sp}$ range. The multiple-grid design ensures that a large accelerating potential can be applied without exceeding the breakdown potential between adjacent grids. An exemplary two-dimensional ion trajectory simulation through multiple nanoFET grids as shown in FIG. 3 illustrates that particles such as ions (as well as nano-particles in similar grids not shown) experience steady acceleration through each grid and that the use of multiple grids helps to collimate the overall beam, thus minimizing spreading due to space-charge effects.

Thus, by reducing beam divergence and by better coupling the grid potentials to the charged particles, the present multi-grid approach improves the efficiency and likely lifetime of micron-scale field emission accelerators both at high $I_{sp}$ with ions 38 and at lower $I_{sp}$ with charged nano-particles 44. NanoFET is an extension to colloid thrusters, but emitting charged conducting nano-particles of known size and charge-to-mass ratios of the present disclosure instead of charged liquid droplets eliminates the colloid thruster limitations of a distribution of sizes and charge-to-mass.

Figure 6:
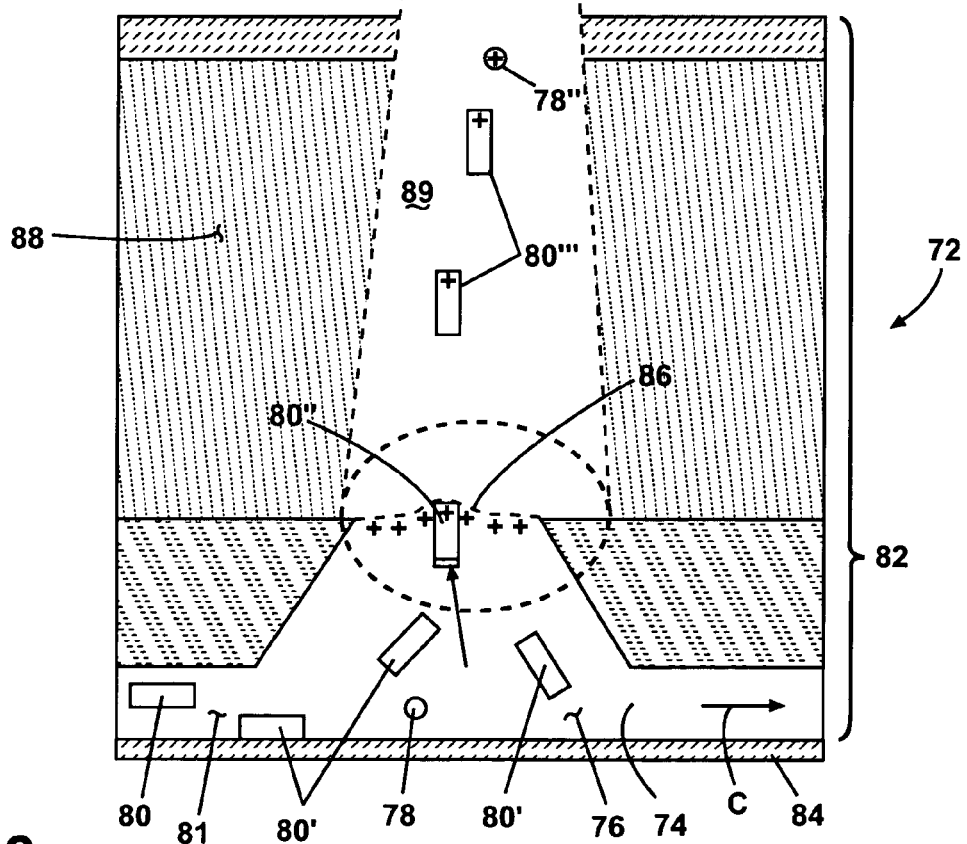
FIG. 6 is a cross-sectional side elevation view of the multi-layer grid of the thruster of FIG. 2 showing both cylindrical nano-particle flow and charge oriented cylindrical nano-particles.

Referring now to FIG. 6, a model of a single emitter 72 from a nano-particle thruster uses an insulating liquid reservoir 74 having a volume of insulating dielectric liquid 76. Uncharged nano-spheres 78 and nano-cylinders 80 (collectively nano-particles) are fed into the liquid filled reservoir 74 through microfluidic passages 81. The spherical particles can have a diameter ranging between approximately 2 nm to greater than 20 nm. The cylindrical particles can range in length between approximately 50 nm to greater than 450 nm. The uncharged nano-particles 78, 80 that come into contact with a bottom electrode 84 are charged (shown and further described as charged nano-cylinders 80'). The charged nano-cylinders 80' are subjected to an electric field created by an acceleration grid 82, causing the exemplary charged nano-cylinders 80' to be directed toward a liquid surface 86 by the electric field. Field focusing can be used to axially rotate charged nano-cylinders 80' approximately perpendicular to the orientation of the bottom electrode 84 (shown after rotation as charged nano-cylinder 80"). The electrostatic Coulomb force causes the charged nano-cylinder 80" to break through the surface tension of liquid 76, and lift out of the liquid 76. Once extracted, the positively charged and extracted nano-cylinders 80''' are accelerated in a vacuum or gap area by an electric field 89 created by conductors and oxide layers identified as field generator 88 and ejected to create thrust.

Figure 7:
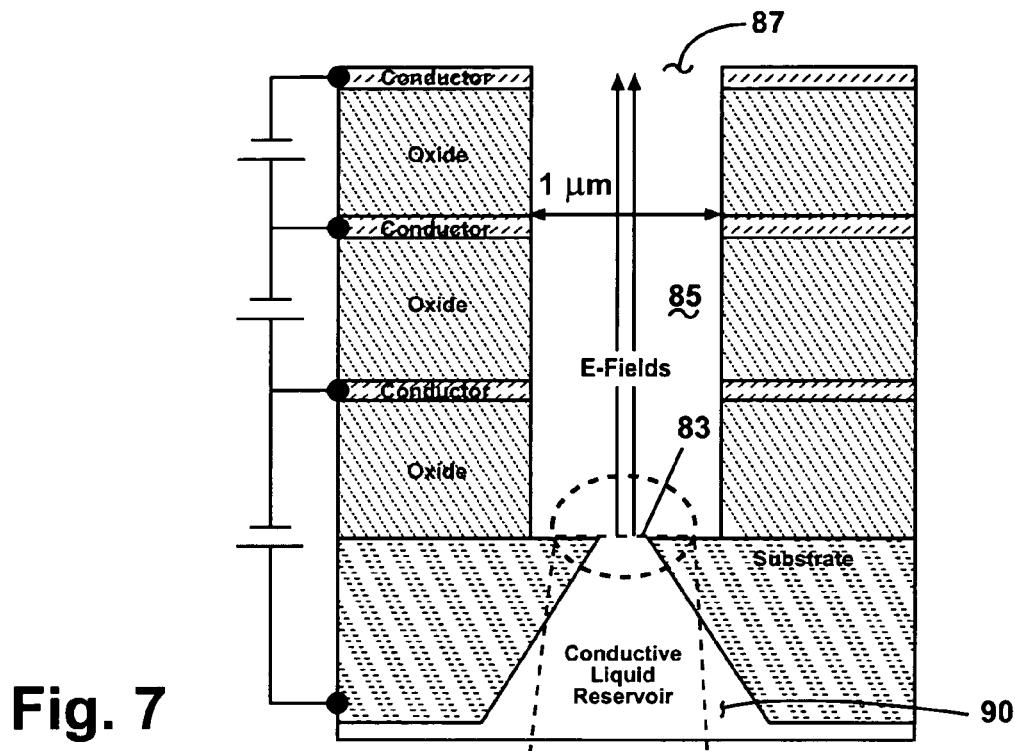
FIG. 7 is cross-sectional side elevational view similar to FIG. 5 for a grid having a conductive liquid reservoir.

Referring in general to FIG. 7, it is also possible to substitute with the general configuration as shown in FIG. 5 a slightly conducting liquid 90. Nano-particles 78, 80 which arrive at a fluid surface 83 are preferentially charged relative to the surrounding surface and are therefore extracted into a vacuum area 85 and ejected at an ion optics region 87.

Figure 1:
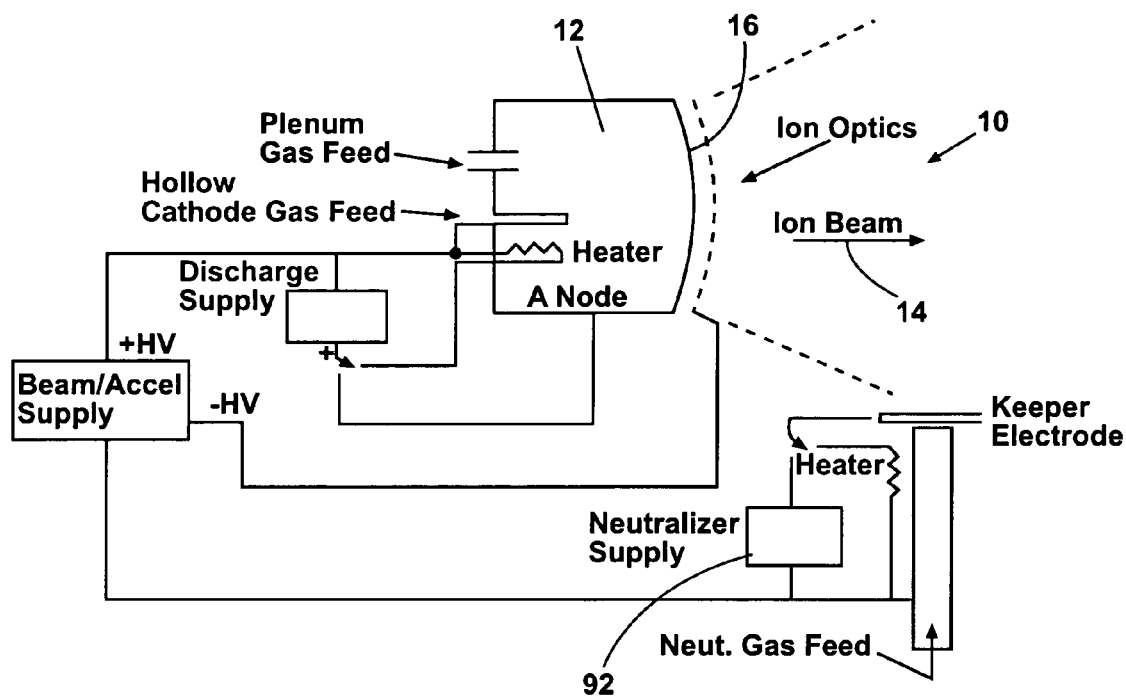
FIG. 1 is a block diagram of a known ion thruster.

Neutralization of the charged particles 78, 80 is required. However, the concept of using MEMS-based technology to manufacture arrays of small vias with biased grids (just like nanoFET) to extract electrons is well known. These are often called FEACs—Field Emission Array Cathodes. It is also possible to bias a separate section of the grid with opposite polarity and emit both positively and negatively charged particles, eliminating the need for a neutralizer 92 (referring back to the ion thruster of FIG. 1) when operating in the nano-particle mode.

The Physics of the present Nano-Particle Propulsion system will be described using the following Nomenclature;

A = cylindrical particle aspect ratio
D = drag force
d = electrode gap
$d_l$ = liquid layer thickness
E = electric field
$E_l$ = liquid electric field
$E_0$ = vacuum electric field
$E_{0,min}$ = minimum vacuum electric field to cause liquid surface instability
$F_{buoyant}$ = buoyant force
$F_{inertial}$ = inertial force
$F_{surface}$ = surface tension force
$g_0$ = gravitational acceleration at Earth's surface
$I_{sp}$ = specific impulse
j = current density
$j_{CL}$ = Child-Langmuir current density
K = "added mass" coefficient
k = wave number
l = cylindrical particle length
$m_l$ = liquid mass displaced by particle
$m_p$ = particle mass
n = particle number density
P = jet power
q = particle charge
$q_0$ = initial particle charge from charging electrode
$q_{0,cy-h}$ = initial charge on horizontal cylindrical particle
$q_{0,cy-v}$ = initial charge on vertical cylindrical particle
$q_{0,sp}$ = initial charge on spherical particle
r = particle radius
T = thrust
t = time
$t_{ex}$ = particle extraction time
V = bias voltage across electrodes
v = particle velocity
v* = characteristic particle velocity
$V_l$ = voltage drop in liquid layer -continued $V_o$ = accelerating potential
W = particle weight
z = axial coordinate
α = drag factor
β = field enhancement factor
γ = surface tension coefficient
$\epsilon_l$ = permittivity of liquid
$\epsilon_0$ = permittivity of free space
$\mu_l$ = dynamic viscosity coefficient of liquid
$\rho_l$ = liquid mass density
$\sigma_l$ = liquid electrical conductivity
τ = charge loss time constant
φ = electric potential
ω = wave frequency To understand the electric fields and particle behavior during the charging, transport, extraction, and acceleration stages, the nanoFET system can be modeled as a pair of biased electrodes separated by a dielectric liquid layer and a vacuum gap. Within the vacuum gap, the electric field is given by:

$$E_0 = \frac{V}{d + \left(\frac{\varepsilon_0}{\varepsilon_l} - 1\right)d_l} \qquad (1)$$

where, within the dielectric liquid, the electric field is:

$$E_l = \frac{\varepsilon_0}{\varepsilon_l}E_0 = \frac{V}{\frac{\varepsilon_l}{\varepsilon_0}d + \left(1 - \frac{\varepsilon_l}{\varepsilon_0}\right)d_l}. \qquad (2)$$

Particle Charging and Lift-Off. For a charged particle to lift off the electrode, the electrostatic and buoyant forces on it must exceed the gravitational, image charge, and adhesion forces restraining it. In a zero-g space environment, the gravitational and buoyant forces are neglected. For particle sizes on the order of the electrode surface roughness, the adhesion force becomes significant and must be taken into account.

For a conductive spherical particle in contact with an electrode and submersed by the liquid, Félici gives the acquired particle charge as:

$$q_{0,sp} = \frac{2\pi^3}{3}r^2\varepsilon_l E_l. \qquad (3)$$

and for horizontally orientated cylinders, the acquired charge is:

$$q_{0,cy-h} = 2\pi r l \varepsilon_l E_l. \qquad (4)$$

Proof-of-concept tests have shown that field focusing on a cylindrical particle's tips leads to a moment that rotates the cylinder from a horizontal to a vertical position prior to lift-off. The acquired charge for a vertically orientated cylinder is:

$$q_{0,cy-v} = \pi\frac{l^2}{\ln\left(\frac{2l}{r}\right) - 1}\varepsilon_l E_l. \qquad (5)$$

As the cylinder rotates from a horizontal to a vertical orientation, it acquires a larger charge and a greater electrostatic lifting force for a given electric field. Consequently, the minimum required electric field for lift-off decreases as the particle becomes vertical.

Particle Dynamics in Liquid. Once the particle leaves the electrode surface, the adhesion and electric image forces rapidly vanish, and a fluid drag force now acts to counteract particle motion through the liquid. For the viscous flow regime, the drag force on a sphere is:

$$D = 6\pi\mu_l r v. \tag{6}$$

A cylindrical particle can be modeled as an elongated rod moving parallel to its axis. The fluid drag becomes:

$$D = \frac{2\pi\mu_l l v}{\ln\left(\frac{l}{2r}\right) + 0.193}. \tag{7}$$

As the particle is transported, charge on the conductive particle is gradually leaked to the liquid. The particle charge decreases with time according to:

$$q(t) = q_0 \exp\left(-\frac{t}{\tau}\right), \tag{8}$$

with the charge loss time constant given as:

$$\tau \equiv \frac{\varepsilon_l}{\sigma_l}. \tag{9}$$

The particle's inertial force must account for the "added mass" of the liquid that is accelerated along with the particle. This inertial force is given by:

$$F_{inertial} = (m_p + K m_l)\frac{dv}{dt}, \tag{10}$$

with the coefficient K dependent on particle geometry. For spheres, this coefficient is equal to 0.5. For cylinders modeled as prolate ellipsoids moving parallel to its axis, the "added mass" becomes negligible at high aspect ratios.

Assuming that a particle's motion is independent of other particles, the equation of motion for a particle in the liquid is shown below. It is noted that in zero-g, the buoyant and gravitational forces vanish.

$$(m_p + K m_l)\frac{dv}{dt} = q(t)E_l - D + F_{buoyant} - W. \tag{11}$$

The expected dynamic behavior of the millimeter-sized particles from the proof-of-concept experiments indicate a particle quickly reaches terminal velocity in the low-Reynolds number flow and traverses the liquid layer fast enough that charge loss to the liquid is negligible. The relative magnitudes of the gravitational forces acting on a particle while it is in the liquid are dominated by the electrostatic and drag forces. As smaller particles are used, the gravitational forces become even less significant.

Particle Extraction through Liquid Surface. At the liquid surface, the particle must overcome surface tension forces in order to be extracted. As the particle size becomes smaller, surface tension becomes increasingly significant because it decreases linearly with the scale of the particle while all other forces decrease by a higher power. The surface tension force is given as:

$$F_{surface} = 2\pi r \gamma. \tag{12}$$

Field focusing on the particle leads to an increase in the electrostatic force extracting the particle at the liquid surface. As a first-order estimate, the field enhancement factor is assumed to be:

$$\beta \approx 1 + \sqrt{\frac{l}{2r}}, \tag{13}$$

which is a scaling typically used for a carbon nanotube field emitters. By making simplifying assumptions that the liquid wets the particle completely for the maximum surface tension force and that particle extraction does not take place until a full particle length above the unperturbed liquid surface, the equations of motion can be iterated to determine the particle dynamics during the extraction process. As in the case of particle motion in the liquid the gravitational forces are negligible compared to the electrostatic forces, drag, and surface tension forces.

Post-Extraction Particle Acceleration. After extraction from the liquid, the particle emerges in a vacuum gap. Neglecting the insignificant gravitational force, the particle undergoes constant accelerated motion due to the vacuum electric field before being expelled to create thrust.

Under the typical conditions of a colloid thruster, a stable cone jet is considered to be a prerequisite for the generation of droplets. The presence of a high electric field near the liquid surface generally creates surface instabilities that are undesirable for nanoFET because they grow to form Taylor cones that can eject fluid droplets. These colloids, with poorly defined charge-to-mass ratios, would reduce the overall nanoFET performance. Nanoparticle protrusion from the liquid surface during the extraction process however, leads to focusing of the electric field on the particle, thus reducing the likelihood of Taylor cone and liquid jet formation.

At equilibrium in the laboratory setting, the liquid achieves a balance between electric pressure, hydrostatic pressure, and surface tension. Using a corrected version of Tonks's formula adapted for dielectric liquids, the minimum vacuum electric field that would cause a perturbed liquid surface to become unstable is:

$$E_{0,min} = \left(\frac{4g_0\gamma\rho_l}{\varepsilon_0^2}\right)^{\frac{1}{4}}\left[1 + \left(\frac{\varepsilon_0}{\varepsilon_l}\right)^2\right]^{-\frac{1}{2}} \tag{14}$$

As gravitational effects vanish in zero-g, this simple model for the critical electric field must be modified to account for the presence of electrohydrodynamic waves. In general, the dispersion relation for these surface waves in the absence of gravity is given by:

$$\omega^2 = -\frac{\varepsilon_0 E_0^2}{\rho_l}k^2 + \frac{\sigma_l}{\rho_l}k^3 \tag{15}$$

The surface is stable if the wave number satisfies the following:

$$k > \frac{\varepsilon_0 E_0^2}{\sigma_l} \quad (16)$$

or if the characteristic spatial scale of the system is smaller than 1/k. Therefore, a smaller spatial scale for the system or a smaller electric field would promote surface stability.

Proof-of-concept tests for vacuum electric fields needed to achieve Taylor cone formation and particle extraction indicate the measured electric fields are in good agreement with Equation 14. For particle extraction, the measured electric fields are within 20% of the theoretical predictions using the simplified extraction model governed by Equation 13. Note that the extraction threshold for each particle type is essentially independent of liquid thickness because of negligible charge loss to the liquid during the proof-of-concept tests. The proof-of-concept tests have demonstrated that a regime exists where particles may be extracted prior to the onset of liquid surface instability.

In nanoFET, charge transport through the viscous liquid generates space charge effects that can limit the maximum current density. The traditional Child-Langmuir equation describes space charge limited flow of charged particles between two parallel electrodes in a vacuum. Assuming that particles start from rest at one electrode and electrostatically accelerate toward the other. This relationship is given by:

$$j_{CL} = \frac{4}{9}\varepsilon_0 \sqrt{\frac{2q}{m_p}} \frac{V^{3/2}}{d^2} \quad (17)$$

Several differences must be taken into account to derive a modified equation applicable for nanoFET. These differences include (1) the presence of a liquid reservoir between the parallel electrodes and the drag forces associated with the liquid, (2) the fact that the electric field at the charging electrode is not zero, and (3) the realization that charge is actually a function of electric potential since a nanoparticle's charge depends on the electric field.

Consider the case of parallel electrodes infinite in extent in the x- and y-directions. From charge conservation, the current density must be constant in the axial direction, or:

$$j = j_z = qnv = \text{constant} \quad (18)$$

The electric potential must obey Poisson's equation:

$$\nabla^2 \varphi = -\frac{qn}{\varepsilon_l} \quad (19)$$

Since the nanoparticles rapidly obtain terminal velocity upon lift-off from the charging electrode, a constant velocity assumption can be made such that the nanoparticle velocity for a given nanoFET configuration depends solely on the local electric field. The particle's terminal velocity in the absence of gravitational forces therefore becomes:

$$v = -\frac{q}{\alpha}\frac{d\varphi}{dz} \quad (20)$$

Where the drag factor (SI units of kg/s) is a function of the particle shape and size as well as the inter-electrode gap and dielectric liquid type:

$$\alpha \equiv \frac{D}{v}, \quad (21)$$

and Poisson's equation thus takes the following form:

$$\frac{d^2\varphi}{dz^2} = \frac{j\alpha}{\varepsilon_l q \frac{d\varphi}{dz}}. \quad (22)$$

Assuming that the nanoparticle traverses the liquid layer fast enough such that charge loss to the liquid is negligible, multiplying both sides of Equation 22 by $d\varphi/dz$ and integrating results in:

$$\frac{d\varphi}{dz} = \left(\frac{2j\alpha}{\varepsilon_l q}z + E_{z=0}^2\right)^{\frac{1}{2}}. \quad (23)$$

Integrating Equation 23 gives the potential drop across the liquid layer as:

$$V_l = \varphi - \varphi_{z=0} = \frac{\varepsilon_l q}{3j\alpha}\left(\frac{2j\alpha}{\varepsilon_l q}z + E_{z=0}^2\right)^{\frac{3}{2}}. \quad (24)$$

In the case of a small electric field at the charging electrode's surface compared to the electric field in the electrode gap, the space charge limited current in the viscous liquid is:

$$j = \frac{9}{8}\varepsilon_l \frac{q}{\alpha}\frac{V_l^2}{d_l^3} \quad (25)$$

The ratio of the current density in the case of viscous media to that described by Child-Langmuir law is determined with drag factor as a parameter. Due to drag, the current density decreases in comparison to the vacuum case. Thus, a higher electric field may be required to provide the same current density as in a vacuum case. Breakdown of the dielectric liquid must be avoided in upcoming liquid and inter-electrode gap geometry optimization. In addition, space charge effects due to drag leads to a decrease of the electric field at the charging electrode, thus decreasing the charge delivered to the particle.

In an electric propulsion system, the specific impulse is directly proportional to the square root of particles' charge-to-mass ratio and is given by:

$$I_{sp} = \frac{1}{g_0}\left(2V_o\frac{q}{m_p}\right)^{\frac{1}{2}}. \quad (26)$$

The thrust-to-power ratio is inversely proportional to the square root of the particles' charge-to-mass ratio and is given by:

$$\frac{T}{P} = \left(\frac{2}{V_o}\frac{m_p}{q}\right)^{\frac{1}{2}}. \quad (27)$$

As nanoparticles are scaled down in size for the nanoFET system, their charge-to-mass ratios scale differently depending on the particle shape. The initial particle charge scales with the square of the particle radius. As the particle travels through the liquid, the final particle charge after accounting for charge loss to the liquid can be determined by:

$$q(t_{ex}) = q_0 \exp\left(-\frac{t_{ex}}{\tau}\right), \propto r^2 \exp\left(-\frac{1}{r}\right) \quad (28)$$

where the extraction time, neglecting any interaction time with the liquid surface, can be approximated as:

$$t_{ex} \approx \frac{d_l}{v^*} \quad (29)$$
$$\propto \frac{1}{r}.$$

Here, the characteristic velocity is set as the particle's terminal velocity, which is quickly reached, in the absence of gravitational forces and charge loss with the liquid:

$$v^* \equiv \frac{\pi^2}{9} \frac{\varepsilon_l E_l^2}{\mu_l} r \quad (30)$$
$$\propto r$$

The final charge-to-mass ratio scales as:

$$\frac{q(t_{ex})}{m_p} \propto \frac{1}{r} \exp\left(-\frac{1}{r}\right) \quad (31)$$

which decreases with smaller particle sizes. Thus, spherical particles of decreasing radii improve the thrust-to-power ratio but decrease the $I_{sp}$ for a given emitter configuration and accelerating potential. For a fixed emitter geometry, the required electric field to extract particles from the liquid surface increases with decreased particle size. As the particle size decreases, so does its terminal velocity in the liquid. Since the particle now takes longer to traverse the liquid layer, it loses more charge to the surrounding liquid before reaching the surface. Consequently, a larger electric field is needed to extract the particle of reduced charge. To overcome this problem, the liquid thickness must be scaled along with the particle size to reduce the liquid layer transit time.

Cylindrical Particles. A similar analysis with cylindrical particles follows. As the particle travels through the liquid, the final particle charge after accounting for charge loss to the liquid can be determined by:

$$q(t_{ex}) = q_0 \exp\left(-\frac{t_{ex}}{\tau}\right) \quad (32)$$
$$\propto \frac{l^2}{\ln(4A)} \exp\left[-\frac{\ln(4A)}{l \ln A}\right],$$

where the aspect ratio is large and given as:

$$A = \frac{l}{2r} \gg 1. \quad (33)$$

Setting the characteristic velocity as the particle terminal velocity in the absence of gravitational forces and charge loss with the liquid:

$$v^* \equiv \frac{1}{2} \frac{\varepsilon_l E_l^2}{\mu_l} \frac{l \ln A}{\ln(4A)} \quad (34)$$
$$\propto \frac{l \ln A}{\ln(4A)}$$

The final charge-to-mass ratio scales as:

$$\frac{q(t_{ex})}{m_p} \propto \frac{A^2}{l \ln(4A)} \exp\left[-\frac{\ln(4A)}{l \ln A}\right] \quad (35)$$

which decreases with shorter cylinders but increases with longer aspect ratios. For a given emitter configuration and accelerating potential, a higher $I_{sp}$ can be achieved by increasing the cylindrical particle aspect ratio. As in the case of the spherical particles, liquid thickness should be scaled down along with the particle length to reduce charge loss to the liquid during particle transport to the surface.

Thruster Performance. By adjusting the nanoparticle size, an enormous range of $I_{sp}$ may be achieved at high efficiencies. The nanoFET system can span an $I_{sp}$ range of 100 to 10,000 s at greater than 90% thrust efficiency with three types of carbon nanotube particles. Inefficiencies in the nanoFET system are due to (1) viscous drag in the liquid, (2) charge loss to the liquid, (3) particle impingement on the MEMS gates, and (4) beam defocusing. The last two sources of inefficiencies are dependent on the MEMS gate design, but the impact of the first two sources of inefficiencies may be lessened by reducing the liquid thickness.

Nano-particle propulsion provides important performance improvements over state-of-the-art ion, colloid, and possibly other thrusters in terms of: A. thrust efficiency; B. specific impulse and specific thrust; C. thrust density; D. lifetime concerns; E. specific mass and scalability, and F. complexity of design. Each of these are further described below.

A. Thrust Efficiency:

Colloid thrusters are one approach to achieve similar results as described herein for nano-particles in a liquid carrier. However, nano-particles give greater control of specific charge of each particle. Further, the use of nano-particles should decrease the losses associated with Taylor cone formation.

Figure 8:
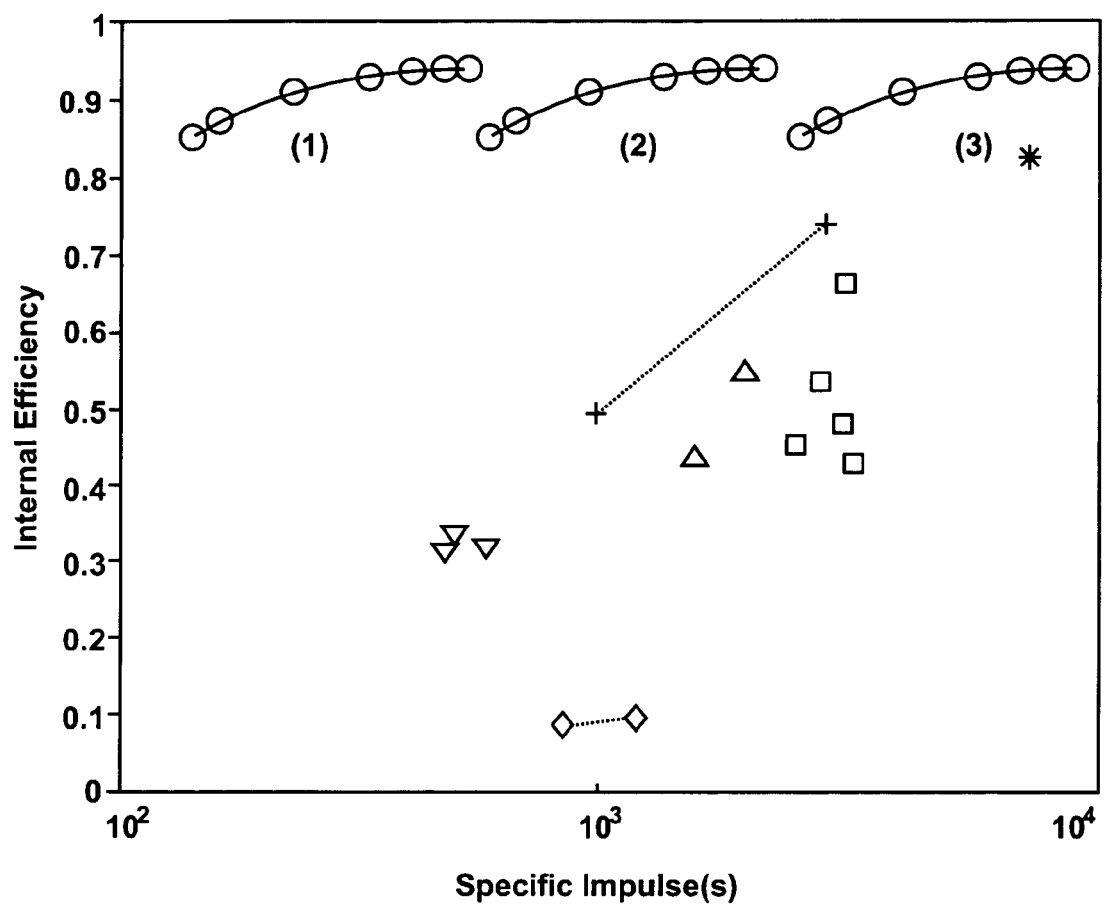
FIG. 8 is a graph comparing the efficiency of the present nano-particle thruster design with other state of the art electrostatic thrusters.

Referring to FIG. 8, a comparison of efficiency with other state of the art electrostatic thrusters is shown. The graph identifies that substantial improvements at both the low $I_{sp}$ and high $I_{sp}$ modes are possible. Both nano-particle and ion emission modes of operation are shown. According to several embodiments, low $I_{sp}$ mode is defined as production of charged nano-particles of defined size used for approximately 100 to 3,000 s range, and high $I_{sp}$ mode is defined as production of charged nano-particle as well as pure ion emission at greater than approximately 3,000 s.

Figure 9:
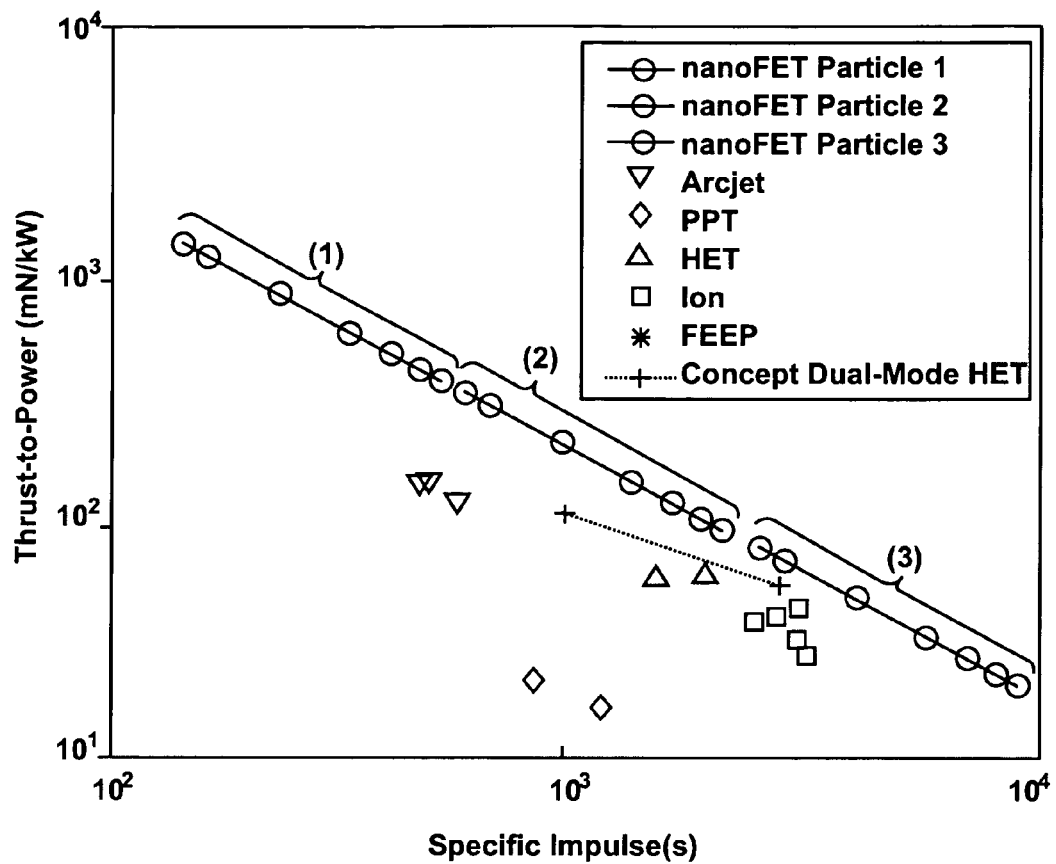
FIG. 9 is a graph comparing the specific thrust and $I_{sp}$ when using cylindrical nano-particles for the thruster of the present disclosure to other state-of-the-art thrusters.

B. Specific Impulse and Specific Thrust Range:

Referring now to FIG. 9 significant improvement in the specific thrust and specific impulse range is possible if the specific charge of the particles can be adjusted and controlled. FIG. 9 compares the expected specific thrust and $I_{sp}$ when using cylindrical nano-particles to other state-of-the-art thrusters.

C. Thrust Density:

State-of-the-art ion thrusters must operate substantially below (and generally an order of magnitude below) the space-charge limit to assure proper ion-optic operation which would otherwise significantly increase sputtering damage and therefore decrease life-time. Known ion thruster architecture is such that slow moving ion plasma is drawn across a small gap. For nano-particles, a different analysis is needed. Isolated emitters operate independently of each other and one condition of importance is whether the amount of charge in the micron-sized hole is close to the charge determined by the capacitance across the gap (gate-to-propellant via). Further, even if nanoFET does approach an equivalent space-charge limit, since the charge may be contained in a fewer number of particles, it is expected that operation much closer to this limit without degradation is possible.

D. Thruster Lifetime:

The lifetime of ion thrusters is limited due to erosion from charge exchange (CEX) collisions in the ion optics region and the discharge plasma source. A CEX collision occurs when a high energy ion collides with a low energy neutral and results in a low energy ion and a high energy neutral. The resulting ion strikes the conducting grid causing erosion. Both of these problems are eliminated when using nano-particle technology. Since only ions or charged nano-particles exist in the NEMS/MEMS grid structures there is no charge exchange, and because no plasma is generated there is no discharge plasma source.

E. Improved Specific Mass and scalability:

While engine life is a critical constraint in many mission planning scenarios, a related and equally constraining thruster characteristic is specific mass. Existing FEEP designs can have a specific mass of approximately 50 g/W. High thruster specific mass increases the mass of a space vehicle. This increase in vehicle mass can increase the needed "burn time" the thrusters must provide to accelerate the spacecraft to the required $\Delta V$ and places constraints on the spacecraft trajectory. For example, a heavy spacecraft would have to avoid certain orbits around moons in the Jovian system to minimize the risk of being captured or pulled in by the planetary body. Thus, increased system specific mass reduces the mission envelope the spacecraft can operate in.

Nano-particle technology of the present disclosure addresses the specific mass through a number of design features. Ultra-long life could reduce the number of thrusters needed for a given mission. While individual conventional thrusters may be sufficiently light for a variety of missions, their insufficient lifespan means that multiple thrusters will be needed for a given "power slot" to accomplish the mission. For example, a 100 kW spacecraft will actually need eight 25-kW ion thrusters if the life of each engine is only half that required to fulfill the mission. In the example above, only four of the longer-lived nano-particle thrusters would be needed. Moreover, the potentially higher thrust density of the thruster reduces the size of each thruster; i.e., one 100-kW thruster has less mass than four 25-kW conventional thrusters. In several embodiments, nano-particle technology of the present disclosure can produce a specific mass of approximately 1 g/W.

F. Complexity of Design:

The "flat panel" concept shown in FIG. 5 results in the propellant management system and power-processing unit being integrated right on the thruster, which reduces mass and integration complexity. Also, the "flat panel" thruster is smaller than conventional ion thrusters and will not need the magnets, grids, and discharge channel walls that account for the bulk of the mass of the latter.

Conducting vs. Insulating Liquid Carrier

Each of the conducting and insulating liquid carrier methods have their own advantages and disadvantages, which will be discussed in this section. The case of an insulating liquid carrier of FIG. 5 was discussed in a previous section, where the particle 78, 80 is charged when it is in contact with the bottom electrode 84 due to the presence of an electric field. Once the particle 78, 80 is charged, it is transported to the liquid/vacuum interface or surface 86 by way of Coulomb's force. This force will continue to extract the particle 78, 80 through the liquid surface 86, accelerate, and finally eject it.

The case of a mildly conducting liquid will work much differently due to the absence of electric fields within the liquid as shown in FIG. 7. Since there are no significant fields in the mildly conducting liquid, another method to transport the particles to the liquid surface where they are charged involves mixing the liquid (by heating, acoustic waves, etc.), which allows the particles to randomly approach the liquid surface. Upon approaching the surface, the (cylindrical) particles align themselves, as shown in the void area having electric field 89 of FIG. 6, due to polarization charging. When the electric field 89 can be focused on the tip of the particle, there is preferential charging, and with sufficient charging the particle is extracted through the surface tension. Once charged and extracted, the particle is accelerated and ejected just as in the insulating liquid case.

Since the behavior of the particles within the liquid is highly dependent on the conductivity of the liquid, there are several advantages and disadvantages of each scenario. Each are discussed as follows.

Advantages of an Insulating Liquid
- The transport of particles within the liquid to the surface can take advantage of electric fields that can be independently established;
- The movement of new particles into the reservoir may be handled in a similar manner by utilizing localized (pulsed) electric fields as well as other possible methods. This allows particles to be moved within the liquid, rather than moving the liquid itself; and
- The formation of Taylor cones or other surface irregularities should be less likely and therefore particle emission should be more uniform.

Advantages of a Conducting Liquid
- The electric fields at the surface of the liquid should be normal to the surface and therefore more in the thrusting direction, which will help to prevent accelerating the particles into the grid structure.

Disadvantages of an Insulating Liquid
- The electric fields at the surface of the liquid may have components tangential to the surface, which can accelerate particles into the grid unless the particle is extracted near the center of the hole in the accelerating grids. This is because the particles reach a low terminal velocity within the viscous liquid and may not have the momentum to keep from being accelerated in the horizontal direction and into the grid structure.

Disadvantages of a Conducting Liquid
- The surface of the liquid has charge density, which may induce Taylor cones; and
- The movement of particles requires either moving the liquid along with the particles or some non-electric method (thermal, ultrasonic) to move just the particles.

A series of initial experiments to better understand nano-particle propulsion have been conducted. The objectives of these initial experiments were to 1) determine the behavior of particles in insulating and conducting liquids subjected to an electric field, 2) prove the feasibility of extracting particles from a liquid by way of electric field, and 3) identify appropriate liquid and nano-particle characteristics for in-space operation. Some experiments were scaled-up, but microstructure experiments were also developed.

Micro- and nano-sized particles and use of a MEMS accelerating gate structure can also be used. Micro-sized particles can range in size up to approximately 10,000 nm in diameter. MEMS gates are conducting grid structures that can be placed over a flat surface to apply an electric field to that surface. The advantage of the MEMS gate over metal screens is that they allow micron-scale or closer surface proximities, thus allowing the application of similarly strong electric fields as metal screens at modest voltages. Nano-structured surfaces such as cubic boron nitride and carbon nano-tubes for "tip-less" electron field-emission cathodes (FEC) can be used as a neutralizer for the nanoFET system to maintain charge balance during thruster operation. A reversed bias on the MEMS gate can be used to provide the electric fields (~1E6 V/cm) needed to extract the nano-particles using modest bias voltages (<300 V).

The MEMS gate includes a conductive layer placed over a dielectric spacer with channels arrayed throughout the structure to permit passage of nano-particles or electrons. Use of micro-fabrication techniques enables the dielectric spacer to be made very thin, with the MEMS gate having a micron-scale dielectric thickness. By placing the conductive layer closer to the emission material; electric fields are concentrated and the bias voltage needed to achieve emission is reduced. Numerical simulations indicate that an approximate 1:1 ratio between the dielectric thickness and the channel diameter produces uniform field lines, so nano-particles used with the current iteration of the MEMS gate have diameters on the order of hundreds of nanometers or less.

In several embodiments, gate layers are supported in a bulk silicon square with 1-cm sides. Ten viewing windows are etched in the bulk silicon to expose the emission channels, with each viewing window containing tens of thousands of emission channels. The top surface of the MEMS gate is a metal layer to facilitate wire bonds to the gate, and open regions are present that enable the gate to be clamped down upon the emission interface. The present MEMS gate is a first generation design that can undergo further optimization. Advanced micro-fabrication techniques can also be employed with device characterization and integrated testing. Optimizations include reducing the gap to decrease required extraction voltages and increasing the transparency. A stacked gate design can also be used to decouple the extraction and acceleration stages.

Figure 10:
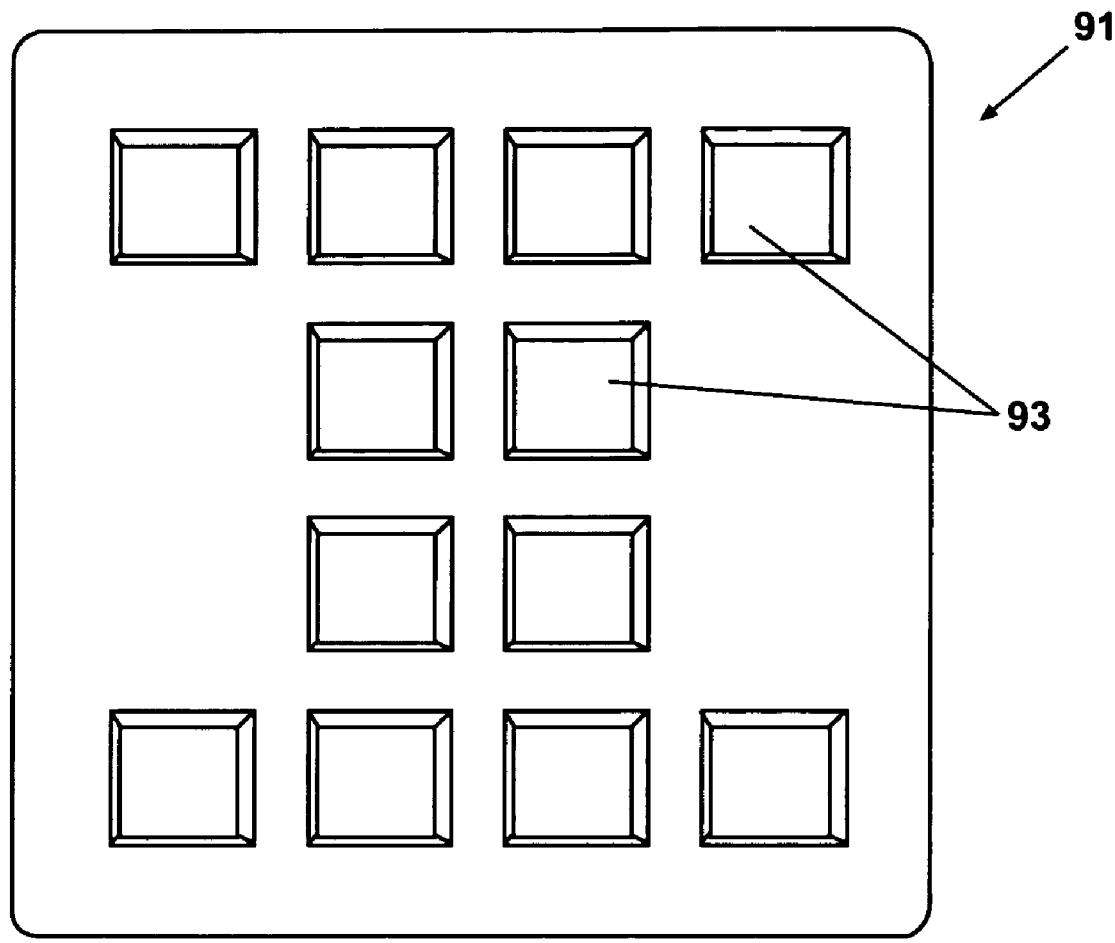
FIG. 10 is a front elevational view of a MEMS gate of the present disclosure.

FIG. 10 illustrates an embodiment of the MEMS gate 91 with 12 viewing windows 93. As noted above, in additional embodiments ten viewing windows can also be used. The MEMS gates are fabricated via optical lithography and doped silicon wafers to minimize voltage drops within the gate.

Referring now to FIGS. 11 through 18, micro-fabrication techniques used in the process are shown and outlined below. In FIG. 11, one side 94 of a silicon wafer 96 is subjected to boron ion implantation to create a sub-micron thick region of highly doped silicon. This highly doped layer 98 serves as the conductive gate layer and also as the etch stop for the final wet etch process. By using ion implantation rather than depositing a separate layer, a thin conductive layer can be formed to reduce gate current collection while still retaining sufficient structural robustness to resist rupture during gate handling and integration.

As seen in FIG. 12, a low-stress silicon nitride layer 100 of micron-scale thickness is grown on top of the highly doped layer 98 to serve as the dielectric spacer. The silicon nitride layer 100 provides a slight tensile stress to keep the gate layers from peeling away from the bulk silicon. With a dielectric constant above 1E7 V/cm, silicon nitride is able to withstand the electric field strengths required for both nano-particle extraction and field emission.

Referring to FIGS. 13 through 15, contact lithography is used to pattern emission channels 102 and backside scribe lanes 104 spaced microns apart center-to-center. The emission channels 102 are created using highly anisotropic reactive ion etch (RIE). The scribe lanes 104 are also formed via RIE.

Referring to FIGS. 15 and 16, on an unprocessed side 106 of the silicon wafer 96 (identified on FIG. 15), a metal layer 108 is deposited to form a surface 110 that facilitates wire bonding to the MEMS gate. Good conductivity exists between the wire bond surface and the highly doped layer 98 due to the low resistivity of the bulk silicon.

Referring now to FIGS. 17 through 18, optical lithography is used to pattern viewing windows 112 and the front-side scribe lanes 114 on the metal (e.g.: gold) layer. A dissolved wafer process using ethylene diamine pyrocatechol (EDP) etches the viewing windows 112 in the bulk silicon to expose the emission channels 102. As best seen in FIG. 18, with scribe lanes on both sides of the wafer, the gate structures are separated from each other as the final step of the EDP bath. This self-dicing prevents the particulate contamination and potential rupturing of the gate layers that could result from mechanical dicing.

To improve yield for the MEMS gates, test chips are included in the fabrication run to monitor each process step. These test chips verify the presence of emission channels and the conductive ion-implanted layer following fabrication, and the test chips also provide an indication of spatial variability during the fabrication process.

Degrees of Freedom

The design of the nano-particle propulsion system of the present disclosure provides many degrees of freedom to obtain the ideal propulsion characteristics. There are three areas of the system that must be considered: the nano-particles, the liquid in the reservoir, and the emitter.

The ability to choose the size, shape, and composition of the nano-particles gives rise to multiple options. As discussed before, an option exists to control the specific charge by determining the size and shape of the particles. This allows the thrust to power ratio to be varied. Other choices include controlling the conductivity and density of the particles.

The choice of liquid determines how the particles behave before and during extraction. Some important liquid characteristics are surface tension, viscosity, conductivity, polarity, permittivity, temperature effects, and behavior in a vacuum. For example, the surface tension must be strong enough to keep the liquid in the reservoir while weak enough to allow the particle to be extracted.

The size of the emitter opening and the gap between the grids offer more degrees of freedom. The breakdown of the dielectric is at approximately 300 V/μm.

In nanoFET, the nanoparticle propellant, whether stored or manufactured in situ, must be transported to the emission sites beneath the electrically biased MEMS gates. At these emission sites, the particles would be charged and accelerated by the imposed electric fields to generate propulsive thrust. Configurations for nanoFET using a recirculating, microfluidic feed system to transport the nanoparticles are described herein. Depending on if the liquid is dielectric or conductive, important differences exist in the particle charging process, transport to the liquid surface, and extraction from the liquid surface. In addition to dielectric and conductive liquid systems, liquid-less transport options for the nanoparticles are also possible.

Whichever type of liquid is used, the liquid must not be volatile to avoid excessive fluid loss to the space environment, and the liquid's wetting characteristics with respect to the gate materials must be matched such that a consistent liquid-vacuum interface is maintained. By using stacked gate structures, large acceleration potentials may be applied, decoupled from the electric potential needed to extract the particles from the liquid, without exceeding the breakdown strength of the separate dielectric layers. Preliminary charged particle trajectory simulations also suggest that beam collimation is improved with the stacked gate design of the present disclosure, resulting in improved thruster efficiency and lifetime.

For a dielectric liquid, as noted herein a potential bias is applied between the stacked gate structure and the charging plate submersed within the dielectric liquid. As a result, electric fields are generated both within and above the liquid. Conductive particles delivered to the liquid reservoir come in contact with the conducting plate and become charged. If the particles are cylindrical, the acquired charge is directly proportional to the liquid electric field. When a particle becomes sufficiently charged, it lifts off the charging electrode and is transported to the liquid surface by the imposed electric field. If the particle has sufficient energy to break through the liquid surface, field focusing extracts the particle from the liquid. The particle is then accelerated through the gate structure and ejected to produce thrust.

For conductive liquids, a potential bias applied between the stacked gate structure and the liquid reservoir results in electric fields above the liquid only. Once delivered to the liquid reservoir, conductive particles cannot be charged within the liquid, since no electric field exists within the liquid reservoir. To become charged, the particles must reach the liquid surface. This transport can be accomplished through thermal motion or convective mixing. Particles at the liquid surface become charged in the presence of the vacuum electric field in the same manner as particles become charged in the dielectric configuration in the presence of the liquid electric field. Field focusing then extracts the particle from the liquid, resulting in particle acceleration through the gate structure and ejection from the thruster.

The fundamentals of a MEMS/NEMS based flat-panel thruster along with nano-particle electric propulsion provide an improved reliability and highly scalable propulsion system capable of operating over a large range of thrust and $I_{sp}$. Using MEMS/NEMS based field emission, it is possible to improve lifetime by eliminating an ion thruster's discharge chamber and issues associated with CEX erosion in the ion optics region. It offers many degrees of freedom that allow it to be tweaked for the needs of various missions. The MEMS/NEMS based flat-panel electric thruster can also be used in other than propulsion system applications, including but not limited to operation as a source of charged or uncharged particles.

What is claimed is:

1. A propulsion system, comprising:
   a grid;
   a gimbal supporting the grid; and
   a plurality of micron-size vias disposed in the grid, the grid establishing electrical fields to extract and accelerate a plurality of nano-particles providing propulsion system thrust.

2. The propulsion system of claim 1, further comprising a plurality of conductors disposed about each of the plurality of micron-size vias generating the electrical field levels.

3. The propulsion system of claim 2, further comprising a dielectric material disposed between successive ones of the conductors.

4. The propulsion system of claim 3, further comprising a liquid disposed in the grid suspending the plurality of nano-particles prior to extraction of the nano-particles.

5. The propulsion system of claim 4, further comprising an electrode immersed in the liquid charging the nano-particles by contact of the nano-particles with the electrode.

6. The propulsion system of claim 4, wherein the liquid further comprises a conductive liquid.

7. The propulsion system of claim 4, wherein the liquid further comprises a substantially insulating liquid.

8. The propulsion system of claim 4, further comprising a void space defined between opposed electrodes and positioned proximate to a surface of the liquid operable to receive extracted ones of the nano-particles.

9. A scalable flat-panel nano-particle thruster, comprising:
   a grid having a plurality of electrodes each defining an electrical field;
   a liquid disposed in a liquid reservoir of the grid, the liquid positioned to be operably contacted by the electrical fields;
   a plurality of nano-particles suspended in the liquid; and
   a plurality of micron-size vias disposed in the grid;
   wherein the electrical fields extract the plurality of nano-particles from the liquid and accelerate the nano-particles in the vias to provide propulsion system thrust.

10. The thruster of claim 9, wherein the plurality of nano-particles further comprise cylindrical particles having particle tips positionable with respect to the electrodes by the electrical fields.

11. The thruster of claim 10, wherein the cylindrical particles further comprise a length ranging between approximately 50 nm to greater than 450 nm.

12. The thruster of claim 9, wherein the plurality of nano-particles further comprise spherical particles having a diameter ranging between approximately 2 nm to greater than 20 nm.

13. The thruster of claim 9, comprising a 100-10,000 s specific impulse range at a thrust efficiency range of approximately 90 percent and greater.

14. The thruster of claim 9, wherein the liquid further comprises a substantially insulating low vapor pressure dielectric liquid.

15. The thruster of claim 9, wherein the liquid further comprises a conducting liquid.

16. A propulsion system, comprising:
   a planar grid including:
      a liquid having a surface;
      a plurality of nano-particles disposed in the liquid;
      an electrode immersed in the dielectric liquid charging the particles by contact of the particles with the electrode;
      a plurality of gate structures generating both an electric field and an electrostatic force, the electrostatic force both lifting the particles off the electrode and overcoming a surface tension force of the liquid allowing the particles to escape through the surface of the liquid; and
      a plurality of vias within each of the gate structures, each receiving and discharging the particles after escape through the surface of the liquid, the imposed electric field acting through the vias to accelerate the particles and generate a thrust force.

17. The propulsion system of claim 16, further comprising at least one particle storage unit connected to the grid and storing the plurality of nano-particles in a non-charged state prior to disposition into the liquid.

18. The propulsion system of claim 17, wherein the at least one particle storage unit further comprises a plurality of particle storage units each connected to another one of the particle storage units, wherein varying a quantity of the particle storage units varies a length of the propulsion system.

19. The propulsion system of claim 16, wherein the planar grid further comprises at least one of micro-electromechanical system structures having microfluidic channels and nano-electromechanical system structures.

20. The propulsion system of claim 16, further comprising a primary power unit connected to the gate structures and generating both the electric field and the electrostatic force.

21. The propulsion system of claim 16, further comprising a liquid reservoir disposed in a substrate of the gate structures and containing the liquid.

22. The propulsion system of claim 16, wherein the liquid further comprises a substantially insulating low vapor pressure dielectric liquid.

23. The propulsion system of claim 16, wherein the liquid further comprises a conducting liquid.

24. The propulsion system of claim 16, further comprising:
an extraction zone defined proximate to the electrode; and
a plurality of microfluidic channels within each of the gate structures transferring the nano-particles and the liquid to the extraction zone.

25. The propulsion system of claim 16, further comprising a plurality of second gate structures generating a reverse electric field to neutralize a charge of the particles prior to discharge from the propulsion system.

26. A method for operating a nano-particle thruster, the method comprising:
suspending a plurality of nano-particles in a liquid;
circulating the liquid to transport the nano-particles to a plurality of extraction zones;
charging the nano-particles at the extraction zones by contact of the particles with an electrode immersed in the liquid;
lifting the nano-particles off the electrode using an imposed electric field creating an electrostatic force;
extracting the nano-particles through a surface of the liquid using the electrostatic force, the electrostatic force overcoming a surface tension force of the liquid; and
accelerating the nano-particles using the imposed electric field.

27. The method of claim 26, further comprising transporting the particles to the surface of the liquid by the electrostatic force prior to the extracting step.

28. The method of claim 26, further comprising selecting the nano-particles having predetermined dimensions and charge states.

29. The method of claim 26, further comprising transporting the nano-particles through a plurality of microfluidic channels prior to the charging step.

30. The method of claim 26, further comprising generating the electrostatic force using biased micro-electromechanical system (MEMS) gate structures.

31. The method of claim 26, further comprising:
tuning a desired thrust characteristic by changing at least one of a nano-particle size and shape; and
operating the thruster using one of a spherical and a cylindrical nano-particle shape.

32. A method for generating thrust using a nano-particle thruster system, the method comprising:
suspending a plurality of cylindrical nano-particles in a dielectric liquid;
charging the particles by contact of the particles with an electrode immersed in the liquid;
lifting the nano-particles off the electrode using an imposed electric field creating an electrostatic force;
field focusing the electric field on a tip of the particles to rotate the particles from a first orientation having a longitudinal axis of the particles substantially parallel to the electrode to a second orientation substantially perpendicular to both the electrode and a surface of the liquid;
extracting the nano-particles through the surface of the liquid using the electrostatic force, the electrostatic force overcoming a surface tension force of the liquid; and
accelerating the nano-particles using the imposed electric field to generate a thrust.

33. The method of claim 32, further comprising creating a charge field proximate the liquid surface receiving the extracted nano-particles.

34. The method of claim 32, further comprising circulating the liquid to transport uncharged ones of the nano-particles to the electrode.

* * * * *

UNITED STATES PATENT AND TRADEMARK OFFICE
CERTIFICATE OF CORRECTION

PATENT NO. : 7,516,610 B2 Page 1 of 1
APPLICATION NO. : 11/545037
DATED : April 14, 2009
INVENTOR(S) : Brian E. Gilchrist et al.

It is certified that error appears in the above-identified patent and that said Letters Patent is hereby corrected as shown below:

Column 5, line 35  "；" should be --:--.

Column 6, line 13  "Φ" should be --φ--.

Signed and Sealed this

Fourteenth Day of July, 2009

JOHN DOLL
*Acting Director of the United States Patent and Trademark Office*